United States Patent
Waldie et al.

(10) Patent No.: US 10,442,900 B2
(45) Date of Patent: Oct. 15, 2019

(54) MIXED PHOSPHITE STABILIZATION OF POLYETHYLENE FILM

(71) Applicant: NOVA Chemicals (International) S.A., Fribourg (CH)

(72) Inventors: Fraser Waldie, Calgary (CA); Owen Lightbody, Calgary (CA); Tony Tikuisis, Calgary (CA); P. Scott Chisholm, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 109 days.

(21) Appl. No.: 15/844,922

(22) Filed: Dec. 18, 2017

(65) Prior Publication Data

US 2018/0186942 A1     Jul. 5, 2018

(30) Foreign Application Priority Data

Jan. 5, 2017    (CA) .................................. 2953610

(51) Int. Cl.
| | |
|---|---|
| *C08K 5/52* | (2006.01) |
| *C08J 3/20* | (2006.01) |
| *C08K 5/17* | (2006.01) |
| *C08K 5/526* | (2006.01) |
| *C08J 5/18* | (2006.01) |
| *C08L 23/04* | (2006.01) |
| *C08K 5/00* | (2006.01) |

(52) U.S. Cl.
CPC ............. *C08J 3/203* (2013.01); *C08J 5/18* (2013.01); *C08K 5/17* (2013.01); *C08K 5/526* (2013.01); *C08L 23/04* (2013.01); *C08J 2323/08* (2013.01); *C08J 2323/20* (2013.01); *C08K 5/005* (2013.01); *C08K 2201/019* (2013.01); *C08L 2201/08* (2013.01)

(58) Field of Classification Search
CPC . C08J 3/203; C08J 5/18; C08J 2323/08; C08J 2323/20; C08K 5/17; C08K 5/526; C08K 2201/19; C08L 23/04; C08L 2201/08
See application file for complete search history.

(56) References Cited

U.S. PATENT DOCUMENTS

| | | |
|---|---|---|
| 4,611,016 A | 9/1986 | Hinsken et al. |
| 5,596,033 A | 1/1997 | Horsey et al. |
| 5,844,029 A | 12/1998 | Prabhu et al. |
| 5,883,165 A | 3/1999 | Krohnke et al. |
| 6,077,890 A | 6/2000 | Hudson et al. |
| 6,664,317 B2 | 12/2003 | King, III |
| 7,361,703 B2 | 4/2008 | Tikuisis et al. |

FOREIGN PATENT DOCUMENTS

WO     2016063200 A1     4/2016

OTHER PUBLICATIONS

Stadler, Urs; Impact of Stabilization Additives on the Controlled Degradation of Polypropylene; Polyolefins 2001—The International conference on Polyolefins, Houston, TX, Feb. 25-28, 2001; pp. 521-542.
ASTM D 1925-70 (Reapproved 1988); Standard Test Method for Yellowness Index of Plastics; Copyright ASTM International; Current edition approved Jan. 22, 1970. Published Mar. 1970. Originally published as D 1925-62T. Last previous edition 63T. pp. 1-3.
ASTM D1238-13; Standard Test Method for Melt Flow Rates of Thermoplastics by Extrusion Plastometer; Copyright ASTM International; Current edition approved Aug. 1, 2013. Published Aug. 2013. Originally approved in 1965. Last previous edition approved in 2010 as D1238-10. pp. 1-16.

*Primary Examiner* — Edward J Cain
(74) *Attorney, Agent, or Firm* — Julie L. Heinrich

(57) ABSTRACT

In some embodiments, this disclosure provides a process for the stabilization of thermoplastic polyolefins during melt processing operations. In some embodiments, the stabilizer package disclosed herein is "phenol free" and contains at least one solid aryl monophosphite and a specific liquid phosphite. The processes disclosed herein are suitable for the manufacture of polyethylene film.

7 Claims, No Drawings

MIXED PHOSPHITE STABILIZATION OF POLYETHYLENE FILM

This disclosure relates to the melt processing of polyolefins using a stabilizer which is essentially free of any phenolic antioxidant.

Polyolefins are conventionally stabilized with a phenolic antioxidant and a phosphite. A hindered amine light stabilizer (or "HALS") may also be included if long term stabilization is desired. These formulations generally provide adequate stabilization performance during the melt processing operations which are used to produce finished plastic parts from the thermoplastic polyolefin resin and during the normal lifetime of the parts.

It is generally accepted that:
1. Carbon centered radicals (or "CCRs") are formed when polyolefins are subjected to heat and sheer during melt processing;
2. CCRs react with oxygen to form peroxy radicals (or "PRs"); and
3. PR's react with the polyolefin to form hydroperoxides (or "HPs") and more CCRs.

In a conventional phenol/phosphite stabilizer system, it is generally accepted that:
1. the phenolic (which is also referred to as the "primary" antioxidant) decomposes the carbon centered radicals and peroxy radicals; and
2. the phosphite (which is also referred to as the "secondary" antioxidant) decomposes the hydroperoxides.

In addition, it is generally accepted that (a) the phenolic antioxidant provides a synergistic effect at the temperatures which are encountered during melt processing by reducing the rate at which the phosphite is depleted or consumed; and (b) if/when the phosphite is depleted (to below the concentration which is required for the decomposition of the hydroperoxides) then the structure of the polyolefin is altered by the action of the free radicals. In polypropylene, this generally results in "chain scission" (a reduction in the molecular weight of the polypropylene) whereas "crosslinking" is generally believed to predominate in polyethylene (which results in an increase in apparent molecular weight).

Stabilizer packages which comprise a combination of a phenolic antioxidant and a phosphite are in wide spread commercial use and generally provide efficient and cost effective results.

However, the use of phenolics is associated with color development in the finished plastic parts, for example in polyethylene or polypropylene which is produced with a transition metal catalyst (such as titanium, vanadium, zirconium or chromium). For example, "yellowing" and "pinking" have been observed in plastic parts which are stabilized with a phenolic antioxidant.

Thus, as noted in U.S. Pat. No. 5,596,033: "there is a long-felt need in the market place for a stabilizer system which can prevent color formation associated with the use of phenolic antioxidants".

Several "phenol free" stabilization systems have been proposed and brief overviews of several of these systems follow:
1. Phosphites plus hindered amines (HALS): these phenol free systems are reported to lack adequate process stabilization (see U.S. Pat. No. 5,596,033).
2. N,N-dialkylhydroxylamine plus HALS: these phenol free systems are expensive (due to the high cost of the hydroxylamine) and may have restricted use in certain food contact applications due to FDA regulations (again, due to the presence of the hydroxylamine) (U.S. Pat. No. 5,596,033).
3. HALS, plus hydroxylamine (or nitrone) plus phosphite: as above, these phenol free systems are expensive and may have restrictions upon their use (U.S. Pat. No. 6,664,317).
4. HALS plus hydroxylamine plus a mixture of two hydrolytically resistant phosphites: as above, these phenol free systems are expensive and may have restrictions upon their use (U.S. Pat. No. 6,077,890).
5. Lactones (such as benzofuranone) plus HALS: these phenol free systems are also expensive (due to the high cost of the lactone) and may have restricted use due to FDA regulations concerning the use of lactones (U.S. Pat. No. 5,883,165).
6. A combination of aryl monophosphite with a diphosphite: (U.S. Pat. No. 7,361,703). These systems may "plate out" of LLDPE compositions because the solubility of this monophosphite/diphosphite system in LLDPE is quite low.

In some embodiments the present disclosure provides an effective low cost, phenol free stabilization package for the melt processing of polyolefins.

In some embodiments the present disclosure provides a process for stabilizing a thermoplastic polyolefin during melt processing conditions, said process comprising the step of incorporating into said thermoplastic polyolefin a stabilizer package comprising:
1) a solid aryl monophosphite; and
2) a liquid phosphite defined by the term: phosphorous acid, triphenyl ester, polymer with α-hydro-ω-hydroxypoly [oxy(methyl-1,2-ethanediyl)], $C_{10-16}$ alkyl esters
and subjecting said thermoplastic polyolefin to sufficient temperature to melt said polyolefin;
with the proviso that said stabilizer package is essentially free of any additive chosen from hindered phenolic antioxidants, lactone stabilizers and hydroxylamine stabilizers.

This disclosure generally relates to the melt processing of polyolefins using a stabilizer system which is essentially free of phenolic antioxidant.

The "phenol free" melt processing operation of this disclosure is generally suitable for any thermoplastic polyolefin, though, in some embodiments, thermoplastic polypropylene and polyethylene are preferred. In some embodiments thermoplastic polyolefins are prepared with a transition metal catalyst such as titanium, vanadium, zirconium or chromium. In some embodiments disclosed herein are polyolefins which contain from about 0.5 parts per million by weight ("ppm") to about 15 parts per million by weight of transition metal residue. (In some embodiments the process disclosed may not provide complete process stabilization if the polyolefin contains more than 15 parts per million transition metal. In some embodiments the disclosed process may not be required if the polyolefin contains less than 0.5 ppm of transition metal). In addition, the polyolefin may contain magnesium residues (in amounts up to 500 ppm); aluminum residues (in amounts up to 150 ppm); and chlorine residues (in amounts up to 200 ppm).

In some embodiments the thermoplastic polyolefin is a linear polyethylene having:
(i) a density of from 0.880 grams per cubic centimeter (g/cc) to 0.960 grams per cubic centimeter (g/cc)—for example from 0.910 to 0.945 g/cc; and
(ii) a melt index, $I_2$, as determined by ASTM D 1238 of from 0.3 (grams per 10 minutes) to 150, or for example from 1 to 100, or for example, from 1 to 5.

In some embodiments the linear polyethylene are copolymers of ethylene with at least one other olefin chosen from butene, pentene, hexene, and octene. These thermoplastic polyethylenes may be produced in any of the known polymerization processes (such as a gas phase process, a slurry process or a solution process) using any known polymerization catalyst (such as a chromium catalyst, a Ziegler Natta catalyst or a single site catalyst such as a metallocene catalyst or a so-called "constrained geometry catalyst").

The melt processing process of this disclosure is characterized by:

(1) the use of a defined solid aryl monophosphite (described in part A below);

(2) the use of a defined liquid phosphite (described in part B below); and (3) that the melt processing is essentially free of a phenolic antioxidant or hydroxylamine or lactone stabilizer (described in part D below).

In addition to the two recited phosphites, the stabilizer package herein, in some embodiments, contains an acid neutralizer (described in Part C.1 below). In embodiments where the finished part is made in accordance with the present disclosure and is intended for long term use, then additional stabilizers (for example HALS) as described in C.2 below are used. Other conventional additives may also be included.

In an embodiment, the linear polyethylene is made with two catalysts (for example a Ziegler Natta catalyst and a single site catalyst) in two or more reactors. It is known that such linear polyethylenes can be especially susceptible to color formation, as disclosed in WO 2016/063200 (Sibtain et al.).

Part A. "Solid Aryl Monophosphite"

As used herein, the term solid aryl monophosphite refers to a phosphite stabilizer which contains:

(1) only one phosphorus atom per molecule; and (2) at least one aryloxide (which may also be referred to as phenoxide) radical which is bonded to the phosphorus.

The aryl monophosphite is a solid at 20° C. (for clarity, the monophosphite is a solid—not a liquid—at 20° C.).

Example aryl monophosphites contain three aryloxide radicals—for example, tris phenyl phosphite is the simplest member of this group of aryl monophosphites.

In some embodiments, solid aryl monophosphites containing $C_1$ to $C_{10}$ alkyl substituents on at least one of the aryloxide groups are preferred.

Non-limiting examples of solid aryl monophosphites follow.

Triphenyl phosphite; tris(2,4-di-tert-butylphenyl) phosphite [IRGAFOS® 168, available from BASF]; and bis(2,4-di-tert-butyl-6-methylphenyl) ethyl phosphite [IRGAFOS 38, available from BASF]; and 2,2',2"-nitrilo[triethyltris(3,3'5,5'-tetra-tert-butyl-1,1'-biphenyl-2,2-'-diyl) phosphite [IRGAFOS 12, available from BASF].

As illustrated by data in the accompanying examples, in some embodiments, the tertiary butyl substituted aryl phosphites are preferred.

The amount of solid aryl monophosphite used in the present disclosure is from 200 to 2,000 ppm (based on the weight of the polyolefin), for example from 300 to 1,500 ppm, or for example, from 400 to 1,000 ppm.

The solid aryl monophosphite is critical to embodiments disclosed herein. Whilst not wishing to be bound by theory, it is postulated that (i) the aryl monophosphite decomposes during the melt processing operation of this disclosure and provides a phenolic structure (in-situ); and (ii) the "in-situ phenolic" provides a synergistic effect with respect to reducing the rate of decomposition of the remaining active phosphite (without leading to the excessive color formation which is typically observed in a conventional phenol/phosphite stabilizers system).

In an embodiment, the aryl monophosphite is tris (2,4-ditertiary butyl) phosphite (CAS Registry Number 31570-044).

Part B. Selected Liquid Phosphite

The liquid phosphite is defined by the term: phosphorous acid, triphenyl ester, polymer with α-hydro-ω-hydroxypoly[oxy(methyl-1,2-ethanediyl)], C10-16 alkyl esters (CAS Reg. No. 1227937-46-3).

Part C.1 Acid Neutralizers

Many commercially available polyolefins contain chloride residues. These chloride residues may generate hydrochloric acid, particularly during melt processing operations. Accordingly, an "acid neutralizer" is conventionally included in a polyolefin stabilization package and, in some embodiments, is preferably included in the process of this disclosure.

These acid neutralizers may be divided into "Inorganic"—such as zinc oxide, synthetic hydrotalcites and Li, Na, Ca or Al (hydroxy) carbonates; and "Organic"—such as salts of fatty acids or their derivatives including calcium stearate, zinc stearate, calcium lactate and calcium stearoyl lactylate.

When employed, these conventional acid neutralizers are used in conventional amounts. In some embodiments, it is preferred to use a synthetic hydrotalcite (in an amount of from 100 to 1,000 ppm), zinc stearate (in an amount of from 200 to 700 ppm) or calcium stearoyl lactylate (in an amount of from 200 to 700 ppm). In some embodiments, a combination of a hydrotalcite with an "organic" acid neutralizer is preferred.

Part C.2 Long Term Stabilizers

In some embodiments, plastic parts which are intended for long term use preferably contain at least one HALS (C.2.1).

Part C.2.1 HALS

In some embodiments, a hindered amine light stabilizer (HALS) is preferably included in the stabilizer package used when the plastic part is intended for more than single/short term use.

HALS are well known to those skilled in the art.

When employed, the HALS may be a commercially available material and may be used in a conventional manner and amount.

Commercially available HALS include those sold under the trademarks CHIMASSORB® 119; CHIMASSORB 944; CHIMASSORB 2020; TINUVIN® 622 and TINUVIN 770 from Ciba Specialty Chemicals Corporation, and CYASORB® UV 3346, CYASORB UV 3529, CYASORB UV 4801, and CYASORB UV 4802 from Cytec Industries. In some embodiments, TINUVIN 622 is preferred. Mixtures of more than one HALS are also contemplated.

Suitable HALS include: bis (2,2,6,6-tetramethylpiperidyl)-sebacate; bis-5 (1,2,2,6,6-pentamethylpiperidyl)-sebacate; n-butyl-3,5-di-tert-butyl-4-hydroxybenzyl malonic acid bis(1,2,2,6,6,-pentamethylpiperidyl)ester; condensation product of 1-hydroxyethyl-2,2,6,6-tetramethyl-4-hydroxypiperidine and succinic acid; condensation product of N,N'-(2,2,6,6-tetramethylpiperidyl)-hexamethylendiamine and 4-tert-octylamino-2,6-dichloro-1,3,5-s-triazine; tris-(2,2,6,6-tetramethylpiperidyl)-nitrilotriacetate, tetrakis-(2,2,6,6-tetramethyl-4-piperidyl)-1,2,3,4butane-tetra-arbonic acid; and 1,1'(1,2-ethanediyl)-bis-(3,3,5,5-tetramethylpiperazinone).

Part C.2.2 Other Optional Additives

C.2.2.1 2-(2'-hydroxyphenyl)-benzotriazoles

For example, the 5'-methyl-,3'5'-di-tert-butyl-,5'-tert-butyl-,5'(1,1,3,3-tetramethylbutyl)-,5-chloro-3',5'-di-tert-butyl-,5-chloro-3'-tert-butyl-5'-methyl-3'-sec-but yl-5'-tert-butyl-,4'-octoxy, 3',5'-ditert-amyl-3',5'-bis-(alpha, alpha-di methylbenzyl)-derivatives.

C.2.2.2 2-Hydroxy-Benzophenones

For example, the 4-hydroxy-4-methoxy-,4-octoxy, 4-decyloxy-, 4-dodecyloxy-, 4-benzyloxy, 4,2',4'-trihydroxy- and 2'-hydroxy-4,4'-dimethoxy derivative.

C.2.2.3 Esters of Substituted and Unsubstituted Benzoic Acids

For example, phenyl salicylate; 4-tertbutylphenyl-salicilate; octylphenyl salicylate; dibenzoylresorcinol; bis-(4-tert-butylbenzoyl)-resorcinol; benzoylresorcinol; 2,4-di-tert-butyl-phenyl-3,5-di-tert-butyl-4-hydroxybenzoate; and hexadecyl-3,5-di-tert-butyl-4-hydroxybenzoate.

C.2.2.4 Acrylates

For example, alpha-cyano-.beta,.beta.-diphenylacrylic acid-ethyl ester or isooctyl ester; alpha-carbomethoxy-cinnamic acid methyl ester; alpha-cyano-.beta.-methyl-p-methoxy-cinnamic acid methyl ester or butyl ester; alpha-carbomethoxy-p-methoxy-cinnamic acid methyl ester; and N-(beta-carbomethoxy-beta-cyano-vinyl)-2-methyl-indoline.

C.2.2.5 Nickel Compounds

For example, nickel complexes of 2,2'-thio-bis(4-(1,1,1, 3-tetramethylbutyl)-phenol), such as the 1:1 or 1:2 complex, optionally with additional ligands such as n-butylamine, triethanolamine or N-cyclohexyl-diethanolamine; nickel dibutyldithiocarbamate; nickel salts of 4-hydroxy-3,5-di-tert-butylbenzylphosphonic acid monoalkyl esters, such as of the methyl, ethyl, or butyl ester; nickel complexes of ketoximes such as of 2-hydroxy-4-methyl-penyl undecyl ketoxime; and nickel complexes of 1-phenyl-4-lauroyl-5-hydroxy-pyrazole, optionally with additional ligands.

C.2.2.6 Oxalic Acid Diamides

For example, 4,4'-di-octyloxy-oxanilide; 2,2'-di-octyloxy-5',5'-ditert-butyloxanilide; 2,2'-di-dodecyloxy-5',5'di-tert-butyl-oxanilide; 2-ethoxy-2'-ethyl-oxanilide; N,N'-bis (3-dimethylaminopropyl)-oxalamide; 2-ethoxy-5-tert-butyl-2'-ethyloxanilide and its mixture with 2-ethoxy-2'-ethyl-5,4-di-tert-butyloxanilide; and mixtures of ortho- and para-methoxy as well as of o- and p-ethoxy-disubstituted oxanilides.

C.2.2.7 Hydroxyphenyl-s-triazines

For example, 2,6-bis-(2,4-dimethylphenyl)-4-(2-hydroxy-4octyloxyphenyl)-s-triazine; 2,6-bis(2,4-dimethylphenyl)-4-(2,4-dihydroxyphenyl)-s-triazine; 5 2,4-bis(2,4-dihydroxyphenyl)-6-(4-chlorophenyl)-s-triazine; 2,4-bis(2-hydroxy-4-(2-hydroxyethoxy)phenyl)-6-(4-chlorophenyl)-s-triazine; 2,4-bis(2hydroxy-4-(2-hydroxyethoxy)phenyl)-6-phenyl-s-triazine; 2,4-bis(2-hydroxy-4-(2-hydroxye tho-xy)-phenyl)-6-(2,4-dimethylphenyl)-s-tri azine; 2,4-bis(2-hydroxy-4-(2-hydroxyethoxy)phenyl)-6-(4-bromo-phenyl)-s-triazine; 2,4-bis(2-hydroxy-4-(2-acetoryethoxy)phenyl)-6-(4-chlorophenyl)-s-triazine; and 2,4-bis(2,4-dihydroxyphenyl)-6-(2,4-dimethylphenyl)-1-s-triazine.

C.2.2.8 Metal Deactivators

For example, N,N'diphenyloxalic acid diamide; N-salicylal-N'-salicyloylhydrazine; N,N'-bis-salicyloylhydrazine; N,N'-bis-(3,5-di-tert-butyl-4-hydrophenylpropionyl)-2-hydrazine; salicyloylamino-1,2,4-triazole; and bis-benzylidenoxalic acid dihydrazide.

C.2.2.9 Peroxide Scavengers

For example, esters of betathiodipropionic acid, for example the lauryl, stearyl, myristyl or tridecyl esters; mercaptobenzimidazole or the zinc salt of 2-mercaptobenzimidazole; zinc-dibutyldithiocarbamate; dioctadecyldisulfide; and pentaerythritottetrakis-(beta-dodecylmercapto)-propionate.

C.2.2.10 Polyamide Stabilizers

For example, copper salts in combination with iodides and/or phosphorus compounds and salts of divalent manganese.

C.2.2.11. Nucleating Agents

For example, 4-tert-butylbenzoic acid; adipic acid; diphenylacetic acid; sodium salt of methylene bis-2,4-dibutylphenyl; cyclic phosphate esters; sorbitol tris-benzaldehyde acetal; and sodium salt of bis(2,4-di-t-butylphenyl) phosphate or Na salt of ethylidene bis(2,4-di-t-butyl phenyl) phosphate.

C.2.2.12. Fillers and Reinforcing Agents

For example, calcium carbonate; silicates; glass fibers; asbestos; talc; kaolin; mica; barium sulfate; metal oxides and hydroxides; carbon black and graphite.

C.2.2.13. Miscellaneous Additives

For example, plasticizers; epoxidized vegetable oils, such as epoxidized soybean oils; lubricants; emulsifiers; polymer process additives (e.g. fluoroelastomers); pigments; optical brighteners; flameproofing agents; anti-static agents; blowing agents and thiosynergists, such as dilaurythiodipropionate or distearylthiodipropionate.

The term "phenol free" has been used herein to refer to a stabilizer package which is "essentially free" of any "primary" antioxidant such as a phenolic, lactone or hydroxylamine. The phrase "essentially free" is meant to convey a plain meaning, namely that none of the phenolic antioxidants (or lactones or hydroxylamines or amine oxides) is deliberately added to the polyolefin in order to achieve the melt stabilization of this disclosure. The "excluded" stabilizers (i.e. the stabilizers which are not deliberately added to the polyolefin according to this disclosure) are described in Part D below.

Part D. Excluded Stabilizers

The process of this disclosure utilizes a stabilizer package which is essentially free of phenolic antioxidants, hydroxyl amines (and amine oxides) and lactones.

Part D.1 Phenolic Antioxidants

D.1.1 Alkylated Mono-Phenols

For example, 2,6-di-tert-butyl-4-methylphenol; 2-tert-butyl-4,6-dimethylphenol; 2,6-di-tert-butyl-4-ethylphenol; 2,6-di-tert-butyl-4-n-butylphenol; 2,6-di-tert-butyl-4isobutylphenol; 2,6-dicyclopentyl-4-methylphenol; 2-(.alpha.-methylcyclohexyl)-4,6 dimethylphenol; 2,6-di-octadecyl-4-methylphenol; 2,4,6,-tricyclohexyphenol; and 2,6-di-tert-butyl-4-methoxymethylphenol.

D.1.2 Alkylated Hydroquinones

For example, 2,6di-tert-butyl-4-methoxyphenol; 2,5-di-tert-butylhydroquinone; 2,5-di-tert-amyl-hydroquinone; and 2,6diphenyl-4-octadecyloxyphenol.

D.1.3 Hydroxylated Thiodiphenyl Ethers

For example, 2,2'-thio-bis-(6-tert-butyl-4-methylphenol); 2,2'-thio-bis-(4-octylphenol); 4,4'thio-bis-(6-tertbutyl-3-methylphenol); and 4,4'-thio-bis-(6-tert-butyl-2-methylphenol).

D.1.4 Alkylidene-Bisphenols

For example, 2,2'-methylene-bis-(6-tert-butyl-4-methylphenol); 2,2'-methylene-bis-(6-tert-butyl-4-ethylphenol); 2,2'-methylene-bis-(4-methyl-6-(alpha-methylcyclohexyl) phenol); 2,2'-methylene-bis-(4-methyl-6-cyclohexyiphenol); 2,2'-methylene-bis-(6-nonyl-4-methylphenol); 2,2'- methylene-bis-(6-nonyl-4methylphenol); 2,2'-methylene-bis-(6-(alpha-methylbenzyl)-4-nonylphenol); 2,2'-methylene-bis-(6-(alpha, alpha-dimethylbenzyl)-4-nonyl-phenol); 2,2'-methylene-bis-(4,6-di-tert-butylphenol); 2,2'-ethylidene-bis-(6-tert-butyl-4-isobutylphenol); 4,4'methylene-bis-(2,6-di-tert-butylphenol); 4,4'-methylene-bis-(6-tert-butyl-2-methylphenol); 1,1-bis-(5-tert-butyl-4-hydroxy-2-methylphenol)butane 2,6-di-(3-tert-butyl-5-methyl-2-hydroxybenzyl)-4-methylphenol; 1,1,3-tris-(5-tert-butyl-4-hydroxy-2-methylphenyl)butane; 1,1-bis-(5-tert-butyl-4-hydroxy-2-methylphenyl)-3-dodecyl-mercaptobutane; ethyleneglycol-bis-(3,3,-bis-(3'-tert-butyl-4'-hydroxyphenyl)-butyrate)-di-(3-tert-butyl-4-hydroxy-5-methylpenyl)-dicyclopentadiene; di-(2-(3'-tert-butyl-2'hydroxy-5'methylbenzyl)-6-tert-butyl-4-methylphenyl)terephthalate; and other phenolics such as monoacrylate esters of bisphenols such as ethylidiene bis-2,4-di-t-butylphenol monoacrylate ester.

D.1.5 Benzyl Compounds

For example, 1,3,5-tris-(3,5-di-tert-butyl-4-hydroxybenzyl)-2,4,6-trimethylbenzene; bis-(3,5-di-tert-butyl-4-hydroxybenzyl)sulfide; isooctyl 3,5-di-tert-butyl-4-hydroxybenzyl-mercaptoacetate; bis-(4-tert-butyl-3hydroxy-2,6-dimethylbenzyl)dithiol-terephthalate; 1,3,5-tris-(3,5-di-tert-butyl-4,10 hydroxybenzyl)isocyanurate; 1,3,5-tris-(4-tert-butyl-3-hydroxy-2,6-dimethylbenzyl)isocyanurate; dioctadecyl 3,5-di-tert-butyl-4-hydroxybenzylphosphonate; calcium salt of monoethyl 3,5-di-tertbutyl-4-hydroxybenzylphosphonate; and 1,3,5-tris-(3,5-dicyclohexyl-4-hydroxybenzyl)isocyanurate.

D.1.6 Acylaminophenols

For example, 4-hydroxy-lauric acid anilide; 4-hydroxy-stearic acid anilide; 2,4-bis-octylmercapto-6-(3,5-tert-butyl-4-hydroxyanilino)-s-triazine; and octyl-N-(3,5-di-tert-butyl-4-hydroxyphenyl)-carbamate.

D.1.7 Esters of beta-(5-tert-butyl-4-hydroxy-3-methylphenyl)-propionic Acid with Monohydric or Polyhydric Alcohols For example, methanol; diethyleneglycol; octadecanol; triethyleneglycol; 1,6-hexanediol; pentaerythritol; neopentylglycol; tris-hydroxyethyl isocyanurate; thidiethyleneglycol; and dihydroxyethyl oxalic acid diamide.

D.1.8 Amides of beta-(3,5-di-tert-butyl-4hydroxyphenol)-propionic Acid

For example, N,N'-di-(3,5-di-tert-butyl-4-hydroxyphenylpropionyl)-hexamethylendiamine; N,N'-di-(3,5-di-tert-butyl-4-hydroxyphenylpropionyl)trimethylenediamine; and N,N'-di(3,5-di-tert-butyl-4-hydroxyphenylpropionyl)-hydrazine.

Part D.2 Hydroxylamines and Amine Oxides

The process of this disclosure is essentially free of hydroxylamine stabilizers. For example, N,N-dibenzylhydroxylamine; N,N-diethylhydroxylamine; N,N-dioctylhydroxylamine; N,N-dilaurylhydroxylamine; N,N-ditetradecylhydroxylamine; N,N-dihexadecylhydroxylamine; N,N-dioctadecylhydroxylamine; N-hexadecyl-N-octadecylhydroxylamnine; N-heptadecyl-N-octadecylhydroxylamine; and N,N-dialkylhydroxylamine derived from hydrogenated tallow amine. The analogous amine oxides (as disclosed in U.S. Pat. No. 5,844,029, Prachu et al.) are also meant to be included by the definition of hydroxylamine (and thus are not used in the process of this disclosure).

Part D.3 Lactones

The process of this disclosure is essentially free of lactone stabilizers.

The use of lactones such as benzofuranone (and derivatives thereof) or indolinone (and derivatives thereof) as stabilizers is described in U.S. Pat. No. 4,611,016.

Melting Processing Operations

In general, the process of this disclosure is suitable for processing molten thermoplastic polyolefins. The melt processing operations are conducted at temperatures from above the melting point of the thermoplastic polyolefin to as high as 400° C.

The present process is particularly suitable for extrusion operations, injection molding operations and rotomolding operations.

In some embodiments, the extrusion of polyethylene film is preferred. Examples of polyethylene film extrusion process include the blown film process and cast film process which are briefly described below.

In a blown film process, the polyethylene is melted in a screw extruder (for example at a temperature of from 200 to 290° C., or for example from 210 to 250° C.) and then forced through an annuler die to form a tube of molten polyethylene. The tube is inflated with air from the interior of the tube, then cooled and finally flattened by nip rolls. It is also known to co-extrude multi layers of film by this process.

In a cast film process, the polyethylene is also melted in a screw extruder (for example at temperatures of from 450° F. (232° C.) to 600° F. (316° C.) for example from 500° F. (260° C.) to 550° F. (288° C.) and then forced through a flat die. The molten polyethylene web is then cooled (typically, through the use of a water bath or, alternatively, temperature controlled casting rolls).

In an injection molding process, the polyethylene is typically melted in a screw extruder and then rammed under very high pressures into a hollow mold.

In a rotomolding process, the polyethylene resin is ground into a fine powder, then charged into a hollow mold. The mold is then placed in a furnace and heated to temperatures of from 250° C. to 325° C. (for example from 520° F. (271° C.) to 600° F. (316° C.)) while the mold is rotated. The molten plastic flows through the mold under the gentle (low shear) forces from the rotation.

The cast film process is especially challenging for stabilization systems because it combines high temperatures and high shear rates.

EXAMPLES

Example 1

Phenolic antioxidants provide a synergistic effect at the temperatures which are encountered during melt processing by reducing the rate at which the phosphite is depleted or consumed. When the phosphite is depleted (to below the concentration which is required for the decomposition of the hydroperoxides) then the structure of the polyolefin is altered by the action of the free radicals. In polypropylene, this generally results in "chain scission" (a reduction in the molecular weight of the polypropylene) whereas "crosslinking" is generally believed to predominate in polyethylene (which results in an increase in apparent molecular weight).

Stabilizer packages which comprise a combination of a phenolic antioxidant and a phosphite are in wide spread commercial use and generally provide efficient and cost effective results. However, the use of phenolics is associated with color development in the finished plastic parts, especially in polyethylene or polypropylene which is produced with a transition metal catalyst (such as titanium, vanadium, zirconium or chromium). For example, "yellowing" and "pinking" have been observed in plastic parts which are stabilized with a phenolic antioxidant.

The present disclosure mitigates this problem by eliminating the use of the phenolic antioxidant.

Stabilizer packages disclosed herein comprise at least one solid aryl monophosphite and at least one liquid monophosphate. The solid aryl monophosphite may be tris(2-4-di-tert-butylphenyl)phosphite (CAS Reg. No. 31570-04-4) (Irgafos 1-168). The liquid phosphite is phosphorous acid, triphenyl ester, polymer with α-hydro-ω-hydroxypoly[oxy(methyl-1, 2-ethanediyl)], C10-16 alkyl esters (CAS Reg. No. 1227937-46-3), sold by Dover Chemicals under the trademark DOVERPHOS® LGP-11.

A series of small scale experiments were completed to investigate the performance of various stabilizers. The experiments were undertaken in a fusion-head mixer (manufactured by C.W. Brabender Instruments, Inc.) equipped with roller mixing blades in a mixing bowl having a 40 cc capacity. The stabilizer formulations (shown in Table 1) were mixed with a polyethylene in the fusion-head mixer for a period of 10 minutes at 160° C.

The polyethylene used in all experiments of example 1 was an ethylene-octene copolymer having a density of 0.920 g/cc and a melt index, $I_2$ (as determined by ASTM D 1238, at 190° C., using a 2.16 kg load) of 1.0 gram per 10 minutes. This polyethylene was produced in a solution phase polymerization process using a Zeigler-Natta type catalyst containing magnesium and titanium and was activated with an aluminum containing activator. The polyethylene contained residual titanium in an amount of greater than 5 but less than 15 ppm.

The polyethylene was removed from the Brabender mixer after the ten minute test and pressed into plaques. Color measurements were performed on the plaques in accordance with ASTM standards (yellow index or "YI" was determined according to ASTM D 1925 and whiteness index or "WI" was determined according to ASTM E313).

Low YI values and high WI values are desirable. Color data are provided in Table 1.

TABLE 1

Color Data for Various Additive Formulations

| Formulation | AO1[1] | AO2[2] | P1[3] | P2[4] | Color (YI) | Color (WI) |
|---|---|---|---|---|---|---|
| C1 | 500 | | 500 | | −1.8 | 67 |
| C2 | | 500 | 500 | | −0.6 | 64 |
| IE1 | | | 500 | 500 | −3.9 | 72 |

[1]AO1 = IRGANOX 1076,
[2]AO2 = IRGANOX1010,
[3]P1 = IRGAFOS 168,
[4]P2 = DOVERPHOS LGP-11

The two control experiments (C1 and C2) were conducted using a conventional stabilizer package that contains a phenolic antioxidant (C1 contained 500 ppm of a phenolic and 500 ppm of a phosphite sold under the trademarks IRGANOX® 1076 and IRGAFOS 168, respectively, by BASF).

C2 contained 500 ppm of a different phenolic antioxidant (sold under the trademark IRGANOX 1010) and the same phosphite used in C1. The stabilizer formulations of C1 and C2 are well known and in wide commercial use.

The color data shown in Table 1 clearly indicate that the comparative stabilizer packages generate undesirable color under the conditions of this experiment. The YI and WI of the resin of experiment C1 were −1.8 and 67, respectively, while the color levels produced in C2 were marginally worse.

Inventive formulation IE1 was prepared using a blend of two phosphite stabilizers at a loading level of 500 ppm each (500 ppm P1 and 500 ppm P2 under the trademarks IRGAFOS 168 by BASF and DOVERPHOS LGP-11 by Dover Chemicals, respectively.

Example 2—Multipass Study

The experiments of this example were performed on a Leistritz twin screw extruder. For the purpose of this evaluation the temperature profile was set to obtain a melt temperature 225° C. The compositions were put through the extruder 3 times (or 3 "passes"). High load melt index (also known as "$I_{21}$") was measured after passes 0, 1, and 3 in accordance with ASTM standards D1238 at 190° C., using a 21.6 kg load. Experimental data are provided in Table 2 (color) and Table 3 (melt flow stability). $I_{21}$ values are reported in grams per 10 minutes (and the smallest deviation from pass 0 MI is desirable).

The desirable "color" performance illustrated in Example 1 is of little practical value unless the stabilizer package also provides "melt flow stability". As previously noted, a useful stabilizer package must protect against chain scission reactions in polypropylene (leading to an increase in melt index) and crosslinking reactions in polyethylene. The problems caused by crosslinking of polyethylene are manifested in changes in the physical properties of the finished polyethylene good. For example, a crosslinking reaction in polyethylene used to prepare film may cause a loss of elongation, impact strength and machine direction (MD) tear strength.

TABLE 2

Color Stability Data (YI) for Various Additive Formulations After Multiple Extrusion Pass Experiment (225° C.)

| Extrusion Pass # | C1 | C2 | IE1 |
|---|---|---|---|
| 0 | −1.8 | −0.6 | −3.9 |
| 1 | 3.2 | 5.2 | −3.1 |
| 3 | 8.2 | 9.8 | −1.4 |

TABLE 3

Change In ($I_{21}$) for Various Additive Formulations After Multiple Extrusion Pass Experiment (225° C.)

| Extrusion Pass # | C1 | C2 | IE1 |
|---|---|---|---|
| 0 | 24.9 | 25.2 | 25.5 |
| 1 | 23.3 | 23.8 | 23.8 |
| 3 | 20.8 | 21.1 | 19.2 |

The present multipass study provides additional data which further reinforce the excellent color performance of the present stabilizer system. Most notably, the data in Table 2 shows that the inventive composition (IE1) still maintained a YI of −1.4 after 3 passes while the comparative compositions turned yellow YI values of 8.2 and 9.8.

Furthermore, the data in Table 3 illustrate that inventive composition IE1 also exhibits good melt flow stability after three passes at 225° C.

What is claimed is:

1. A process for stabilizing a thermoplastic polyolefin during melt processing conditions said process comprising the step of incorporating into said thermoplastic polyolefin a stabilizer package comprising:
   (i) a solid aryl monophosphite; and
   (ii) a liquid phosphite defined by the term: phosphorous acid, triphenyl ester, polymer with a-hydro-ω-hydroxy-poly[oxy(methyl-1,2-ethanediyl)], C10-16 alkyl esters
and subjecting said thermoplastic polyolefin to sufficient temperature to melt said polyolefin;
with the proviso that said stabilizer package is essentially free of any additive chosen from hindered phenolic antioxidants, lactone stabilizers and hydroxylamine stabilizers.

2. The process according to claim 1 wherein said stabilizer formulation contains an acid neutralizer.

3. The process according to claim 1 wherein said stabilizer formulation contains a hindered amine light stabilizer.

4. The process according to claim 1 wherein said thermoplastic polyolefin is a linear polyethylene which contains from 0.5 to 15 ppm of at least one transition metal chosen from titanium, vanadium, zirconium and chromium.

5. The process according to claim 4 wherein said linear polyethylene is a copolymer of ethylene and at least one olefin chosen from butene, pentene, hexene and octene.

6. The process according to claim 5 wherein said linear polyethylene has a density of from 0.880 to 0.960 g/cc and a melt index, $I_2$, as determined by ASTM D1238 of from 0.3 to 150 g/10 minutes.

7. The process according to claim 6 wherein said melting processing conditions comprise a film extrusion at a temperature of from 200° C. to 320° C.

* * * * *